A. KÖHLER.
LIGHTING SYSTEM FOR CINEMATOGRAPHS.
APPLICATION FILED JULY 23, 1913.
1,143,287.
Patented June 15, 1915.
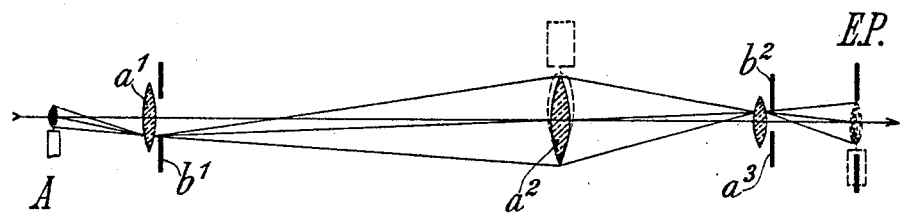

UNITED STATES PATENT OFFICE.

AUGUST KÖHLER, OF JENA, GERMANY, ASSIGNOR TO THE FIRM OF CARL ZEISS, OF JENA, GERMANY.

LIGHTING SYSTEM FOR CINEMATOGRAPHS.

1,143,287.   Specification of Letters Patent.   Patented June 15, 1915.

Application filed July 23, 1913. Serial No. 780,742.

*To all whom it may concern:*

Be it known that I, AUGUST KÖHLER, a citizen of the German Empire, residing at Jena, Germany, have invented a new and useful Lighting System for Cinematographs, of which the following is a specification.

The present invention relates to lighting systems for cinematographs, which are intended to form an image of a source of light in the entrance pupil of the projecting system belonging to the apparatus. For this purpose a condenser system has so far been used, which, placed before the film, forms an image of the source of light in or near the entrance pupil of the projecting system. As, for avoiding an excessive heating of the film, its distance from the source of light and consequently from this condenser system might not be too small, at the locus of the film the evenly luminous central part of the ray pencil system emerging from the condenser system, which part is suitable to be used for the illumination of the said film, was surrounded by a comparatively broad part, which in consequence of its uneven luminosity was useless for the illumination of the film. For cutting off this part of the ray pencil system, the framing itself had to be used, so as to obtain a sharp delimitation of each picture to be projected, which framing contains, as is well known, the window opening serving for the limiting of the image. This led to a considerable heating of this framing, which was dangerous on account of the film being in the immediate neighborhood.

In the new lighting system there is placed on the one hand behind a condenser system a collective lens system, which lies approximately at the locus of the image of the source of light formed by the condenser system and forms an image of the exit pupil of the condenser system approximately in the plane of the film-window, and on the other hand there is disposed behind this collective lens system immediately adjacent to the film-window an auxiliary condenser system, which images in the entrance pupil of the projecting system the image of the source of light formed by the condenser system. In this new system the size of the exit pupil and by this means the size of its image lying in the plane of the film-window may be reduced by a diaphragm adjacent to the condenser system, the part of the ray pencil system falling on the framing of the film-window being thereby restricted as desired, without diminishing thereby the luminosity of the part falling on the film. With a circular diaphragm this restriction is limited by the diameter of the image of the exit pupil having to be at least equal to the diagonal dimension of the film-window.

When it is desired to reduce the heating of the framing of the film-window to zero, it is found convenient to give the diaphragm such a form that the exit pupil of the condenser system is similar to the film-window and of such size that the image of the said diaphragm, formed in the plane of the film-window, is just equal in size to the film-window.

The condenser system, the collective lens system and the auxiliary condenser system each consist in the simplest form of the lighting system of a single spherical lens. For obtaining a more perfect junction of the rays, the three single systems can be developed in a well-known manner, e. g. by the condenser system being constructed of a plurality of members, or by single surfaces being formed as non-spherical surfaces.

The annexed drawing shows diagrammatically an example of the lighting system according to the invention, the three single systems consisting each of a single thin lens.

The locus of the source of light, which is indicated by a flame, is marked A and the locus of the entrance pupil of the projecting system is marked E. P. The condenser lens is marked $a^1$, and the collective lens and the auxiliary condenser lens $a^2$ and $a^3$ respectively. Immediately behind the condenser lens a diaphragm $b^1$, and immediately behind the auxiliary condenser lens the film-window $b^2$ is indicated. The source of light A is imaged by the condenser lens $a^1$ at the locus of the lens $a^2$. By this lens $a^2$ the diaphragm $b^1$, which in this case acts as the exit pupil of the condenser system, is imaged at the locus of the film-window $b^2$, the lens $a^3$, which immediately precedes the film-window, being practically without effect. The image of the source of light, lying at the locus of the lens $a^2$, is imaged by the lens $a^3$ at the locus E. P. of the entrance pupil. When the diaphragm $b^1$ is similar to the film-window $b^2$, its size can, as is evident, be so chosen that its image lying at the locus of the film-window corresponds exactly in size to the latter.

I claim:

1. In a lighting system for cinematographs a source of light, a condenser system, a collective system behind the said condenser system and approximately at the locus of the image of the source of light formed by the said condenser system, a film-window and an auxiliary condenser system located behind the said collective lens system and immediately adjacent to the said film-window, the said collective lens system being adapted to image the exit pupil of the condenser system approximately in the plane of the said film-window and the said auxiliary condenser system being adapted to form a real image of the image of the source of light, formed by the said condenser system.

2. In a lighting system for cinematographs a source of light, a condenser system, a collective system behind the said condenser system and approximately at the locus of the image of the source of light formed by the said condenser system, a film-window and an auxiliary condenser system located behind the said collective lens system and immediately adjacent to the said film-window, the said collective lens system being adapted to image the exit pupil of the condenser system approximately in the plane of the said film-window, the said auxiliary condenser system being adapted to form a real image of the image of the source of light, formed by the said condenser system, and the exit pupil of the condenser system being similar to the said film-window and of such a size that the image of the said pupil, formed in the plane of the film-window, corresponds in size to the film-window.

AUGUST KÖHLER.

Witnesses:
PAUL KRÜGER,
RICHARD HAHN.